J. C. DUNLAP.
Feed-Regulators for Grinding-Mills.
No. 138,384. Patented April 29, 1873.
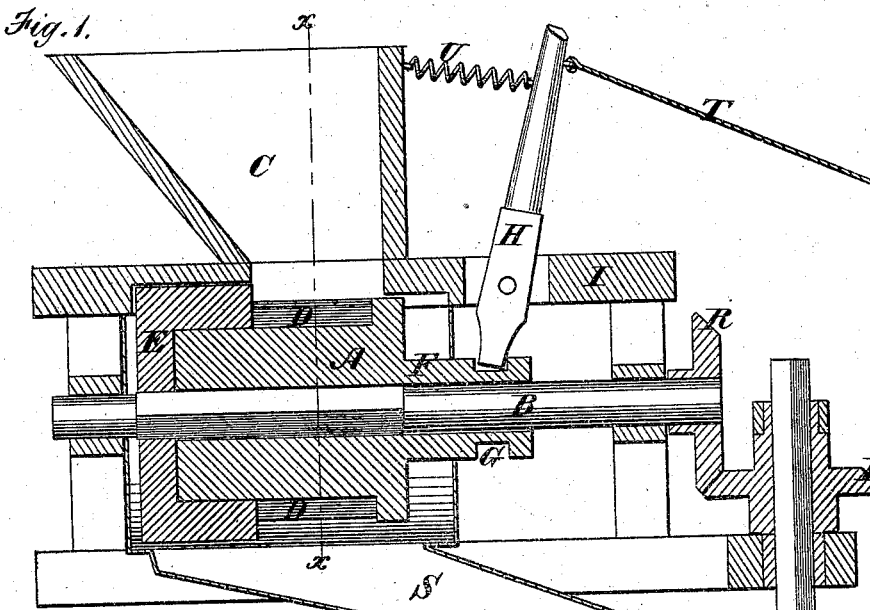
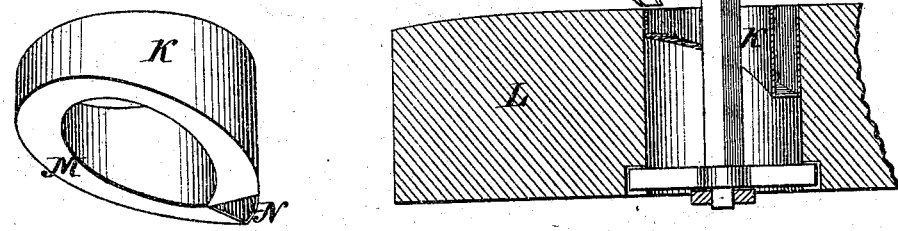
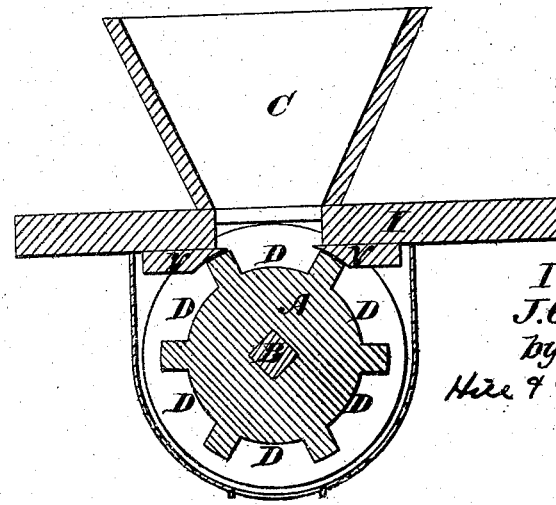
Witnesses.
C. F. Brown
Melville Church
Inventor:
J. C. Dunlap
by his Attys
Hize & Ellsworth

UNITED STATES PATENT OFFICE.

JOHN C. DUNLAP, OF MOFFAT'S CREEK, VIRGINIA.

IMPROVEMENT IN FEED-REGULATORS FOR GRINDING-MILLS.

Specification forming part of Letters Patent No. 138,384, dated April 29, 1873; application filed January 30, 1873.

*To all whom it may concern:*

Be it known that I, JOHN C. DUNLAP, of Moffat's Creek, in the county of Augusta and State of Virginia, have invented a new and useful Improvement in Grinding-Mills; and I do hereby declare the following to be a full and exact description of the same, reference being had to the accompanying drawing forming part of this specification, in which—

Figure 1 is a longitudinal vertical section. Fig. 2 is a transverse vertical section in the line $x$ $x$, Fig. 1; and Fig. 3 is a perspective view of the annular trough in the eye of the runner.

Similar letters of reference in the accompanying drawing denote the same parts.

This invention has for its object to improve the construction of mills for grinding corn and other grains in such manner as to secure an even delivery of the grain to the burrs. To this end the invention consists in a revolving annular trough inserted in the eye of the runner beneath the end of the spout that delivers grain from the feeding-cylinder, said trough having an inclined bottom, and an orifice therein at the lowest part, which drops the grain in a continuous stream upon the bed-stone, all which I will now proceed to describe.

In the accompanying drawing, A is the sliding cylinder, placed on the horizontal shaft B and beneath the hopper C, said cylinder having peripheral pockets D extending lengthwise of the same that, one by one, as the cylinders revolve, receive the grain from the hopper and drop it into the spout S. E is a cylinder fixed on the square part of the shaft B, and having recesses to receive the end of the cylinder A. A collar, F, extending along the shaft B, from the outer end of the cylinder A, has a transverse groove, G, in its periphery, in which groove rests the inner end of a lever, H, pivoted in the cover I, and extending above the same sufficiently far to be operative by hand, or through the instrumentality of a cord, T, so that the attendant may, by its means, slide the cylinder A back and forth along the shaft; and thus, by causing the cylinder A to extend to a greater or less distance into the cylinder E, diminish or increase the size of the peripheral pockets D, as the speed of the stones or the size or dryness of the kernels may require. A spring, U, fastened to the lever and hopper, draws the former back after each pull of the cord. K is the annular chamber inserted in the upper part of the eye of the runner L, and revolving with it. The chamber has a sloping bottom, M, and, at the lower part thereof, an orifice, N. The spout S delivers grain directly into the chamber K, from which it has no way of escape except through the orifice N, which distributes it evenly around the eye of the stone. Where the grain falls directly from the hopper into the eye of the runner, as in ordinary mills, the feed is intermittent and varied, according to the size and condition of the berries and the speed of the machinery. The consequence is that, not being distributed evenly on the bed-stone, the grain tends to clog the operation of the burrs. The revolving chamber K, however, delivers its contents in a continuous stream around the edge of the eye and thus prevents clogging. O is the vertical shaft of the burr. P R are miter-gears, placed one on the shaft O and the other on the shaft B, and, therefore, communicating motion to the latter. As it is necessary, sometimes, to raise the runner, and to lower it after raising, the gear P is placed loose on the shaft O in order that the latter may be adjusted, as may be necessary, without disturbing the gear P or altering its relation to the gear R. V are guards, having concave faces placed under the cover I at each side of the cylinder A, and used to prevent the grain from working between the cylinder and cover.

Having thus described my invention, what I claim is—

1. The annular chamber K, having a sloping bottom and an orifice at the lower part thereof, and placed in the eye of the runner, substantially as and for the purpose specified.

2. The combination of the runner L, annular chamber K, having a sloping bottom and an orifice therein, and the spout S, substantially as and for the purpose specified.

JOHN C. DUNLAP.

Witnesses:
MELVILLE CHURCH,
E. A. ELLSWORTH.